United States Patent [19]
Eigenmann

[11] 3,964,820
[45] June 22, 1976

[54] RETRO-REFLECTING ELEMENT AND METHOD

[76] Inventor: Ludwig Eigenmann, Vacallo, Ticino, Switzerland

[22] Filed: Mar. 19, 1974

[21] Appl. No.: 452,996

[30] Foreign Application Priority Data
Mar. 21, 1973 Italy .................................. 21913/73

[52] U.S. Cl. ................................ 350/104; 350/105
[51] Int. Cl.² .......................................... G02B 5/126
[58] Field of Search .................... 350/104, 105, 106

[56] References Cited
UNITED STATES PATENTS

| | | | |
|---|---|---|---|
| 2,294,930 | 9/1942 | Palmquist | 350/105 |
| 2,951,419 | 9/1960 | Lemelson | 350/106 |
| 3,556,637 | 1/1971 | Palmquist | 350/105 |
| 3,781,083 | 12/1973 | Eigenmann | 350/105 |

Primary Examiner—John K. Corbin
Assistant Examiner—Richard A. Rosenberger
Attorney, Agent, or Firm—Michael J. Striker

[57] ABSTRACT

There is described a retro-reflecting element of generally globular configuration adapted to retro-reflect a ray of light back along its own incident path, when impinged by grazing light on a part-spherical portion of its surface, bulging above the surface of a support layer wherein such element is partially embedded. The new element comprises an essentially optically homogeneous body forming said part-spherical portion and provided, on its remaining surface, with a plurality of closely spaced inwardly concave and reflective part-spherical small bowls capable of sending back, by multiple reflections totalling 180°, light rays impinging on said bulging part-spherical portion and refracted therethrough within said body towards any of said bowls. There is also described a method for making said element.

10 Claims, 3 Drawing Figures

RETRO-REFLECTING ELEMENT AND METHOD

BACKGROUND OF THE INVENTION 1. a. The Field of the Invention

The present invention relates to the art of producing and making use of retro-reflecting elements adapted to reflect a ray of light back substantially along its own incident path, such elements being principally adapted to be partially embedded within a layer of a suitable composition, forming a traffic regulating sign or marker on a roadway pavement to improve nighttime visibility of said sign or maker, expecially when the source of light is provided by a vehicle headlamp system.

2. b. The Prior Art

The provision of retro-reflecting means associated with signs or markers applied and secured to or formed on a roadway pavement has been heretofore considered for better nighttime visibility and safer traffic flow. These means most commonly consist of essentially globular bodies or aggregates of a transparent substance, such as glass, partially embedded and firmly secured in a layer of a preformed tape or strip which is then applied or directly formed on a roadway pavement (such as a traffic lane dividing strip or other marker), and itself forms a part of the road area of said pavement. These partially embedded globules have uncoated part-spherical portions protruding above the upper surface of the layer and the light rays impinge on said portions and are at least in part downwardly refracted within the transparent globules. Reflective coatings or substances are adjacent the embedded portions of the globules for providing retro-reflection of the refracted rays.

According to current art, said retro-reflection requires a single or plural focusing of the light beams within the globule. Said requirement leads in turn to the use of glasses of sufficiently high and even very high refractive index, and it is known that such glasses are costly and have an undesirably low resistance to impacts, to wear and to weather.

In the British patent specification No. 1,343,196 (essentially corresponding to French Pat. No. 2,086,257), a mode for improving the retro-reflectivity of such globules has been disclosed and discussed. Reference is herein made to such patent literature for acknowledgement of this art. There has been disclosed an approach to the problem relating to retro-reflection of light rays which impinge on the exposed and uncoated part-spherical portions under an angle of incidence near 90°. This occurrence is realistic when the sign, on a roadway pavement, is impinged by rays emitted from a sufficient distance by the headlamps of a vehicle, and the motorist can detect the sign from the retro-reflected light only. This prior approach involves a rather complicated and critical system of multiple focusing and refractions, which requires making use of transparent bodies and binders correlated by noticeable relative refractive indexes, and a precise positional relationship.

It is further known by optics that when a light ray crosses the interface between transparent substances having different refractive indexes, at an angle of incidence different from 0°, this ray is in part refracted and in part reflected. The reflected quantity is a function both of the angle of incidence at the interface and of the difference between the refractive indexes of the two substance (a deeper analysis of the phenomenon is unnecessary). In the prior art aggregates and in the systems considered in view of the object of the invention, both that light which is reflected at the exposed part-spherical portion and that which is reflected within the aggregate, is not available for retro-reflection and is dissipated.

It is therefore an object of this invention to provide a new and advantageous retro-reflecting element which has good ability to reflect a light ray back essentially along its own incident path irrespective of the direction along which such incident ray actually impinges on an exposed part-spherical portion of the same element, and which is not subjected to the above and other limitations.

Another object of the invention is to provide a method for producing such new element.

SUMMARY OF THE INVENTION

According to the invention, there is provided a new retro-reflecting element consisting of a generally globular transparent body which is essentially optically homogeneous, adapted to include, when partially embedded in a support layer having an outer face, a transparent part-spherical portion external to said layer, protruding from said outer face and positioned to have light rays impinge thereon for an at least partial refraction within said body, and a portion internal to said layer and having a generally part-spherical surface, at least part of said internal surface, which said refracted light rays are directed, comprising a multiplicity of closely and evenly spaced inwardly concave and reflective part-spherical bowls of amplitude from 90° to 180°.

The expression "essentially optically homogeneous" indicates herein an integrally or compositely formed transparent body all portions of which have essentially the same refractive index, so that interfaces, at which a substantial internal reflection of light rays passing in whatsoever direction through said transparent body may occur, do not exist. A composite structure comprising transparent components adjacent to each other and the relative refractive indexes of which are comprised between 0.8 and 1.2 is to be assumed to be encompassed within the scope of the expression "essentially optically homogenous" body or structure, as far as this invention is concerned, in this specification and in the appended claims.

According also to optics a part-spherical concave and reflective surface is capable, after two reflections, imparting a 180° deviation to a light ray impinging said surface even if the ray impinges in a direction forming a noticeable angle with the axis of said surface. The more the angular amplitude of said surface approaches 180°, the greater is the amount of the thus impinging light that is retro-reflected, and the greater is also the angle at which this light can impinge on the concave reflective surface for being deviated 180°.

In an element as above, no focalization of light beams occurs. The light rays impinging on the exposed part-spherical portion are simply deviated within the transparent body towards an area of its surface internal to the support layer, where some of said concave reflective bowls are located. At least part of such rays is deviated by a reflection of 180° and thus directed towards the said exposed portion where such part is refracted towards the source of light.

The said body, which is either structurally homogeneous or heterogeneous provided that it is essentially optically homogeneous, can be and advantageously is made of a transparent substance or substances having a relatively low refractive index in relation to air, such as from 1.45 to 1.65 for example, that is a refractive index just enough for ensuring the inward refractive deviation of the light rays which impinge on the outer exposed part-spherical portion. Such low refractive index provides, in turn, several advantages.

In particular, common and economical "window glasses" (the refractive indexes of which are of the order of 1.52 about) can be made use of for producing the spherical component or components of the new element. Efficient and transparent resins and binders having such a refractive index range are readily available. The amount of dissipation of the light rays, impinging on the exposed part-spherical portion, by reflection, is minimized especially at high angles of incidence, thus improving the optical response of the elements in service.

These and other objects and advantages of the invention, together with a method for providing the new elements, will be best understood from the following detailed description of the invention, as illustrated in the accompanying drawings.

THE VIEWS OF THE DRAWING

FIG. 1 is an enlarged diagrammatical cross-sectional view of the new element, in service, and illustrates the essential and typical optical behavior thereof, and FIGS. 2A and 2B are detailed fragmentary greatly enlarged cross-sectional view of the element, said FIGURES being differentiated since they illustrate of the structure of and respectively the retro-reflection provided by the concave reflective bowls.

DETAILED DESCRIPTION OF THE PREFERRED EMBODIMENT

Figure 1:
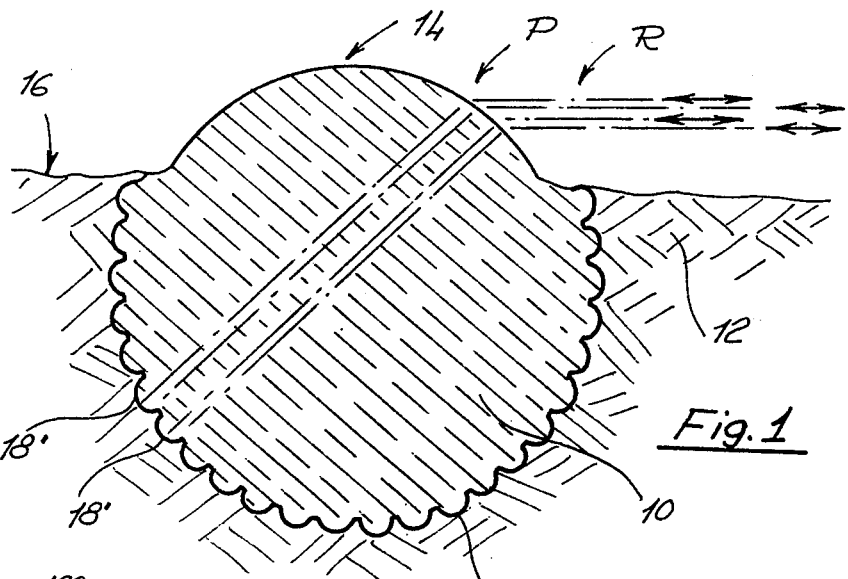

A generally globular transparent body is indicated at 10 in FIG. 1. To illustrate the essential optical homogeneity of such body (irrespective of its structural features) its entire cross-sectional area has been uniformly hatched. Further such body is shown as being partially embedded within a layer 12 (fragmentarily indicated) of, say, a composition adapted to form, according to known art, a traffic regulating sign or marker on a roadway pavement, said layer having an upper exposed face 16. The body comprises an external portion having an exposed part-spherical surface 14, protruding above said upper face 16 of the layer 12.

All about the surface of the embedded portion of the body 10 a plurality of small, evenly and closely spaced inwardly concave and reflecting part-spherical bowls 18 are formed. Assuming that light rays, such as indicated at R, impinge on locations, such as indicated at P, of the exposed surface 14, at least a part of the light is refracted within the body 10 towards its embedded surface where the said reflective bowls 18 are provided. Statistically, a part of the thus inwardly refracted light rays impinges on the inner concave reflective surfaces of such bowls, such as those indicated at 18' for example, in such directions and at such locations that a reflection and a deviation of 180° occurs. Such rays are therefore retro-reflected along paths near and parallel to those of their own incident path.

Figure 2A:
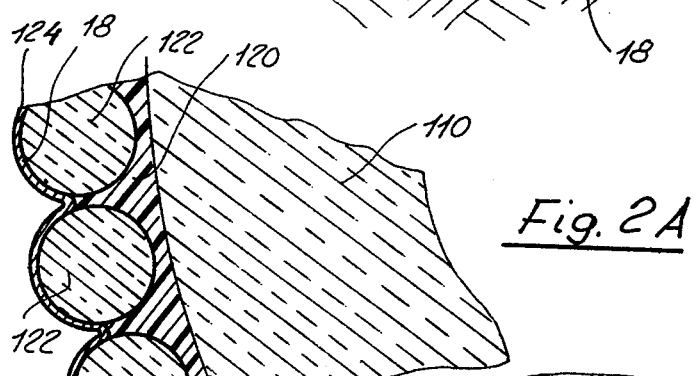

The new elements can be produced generally in the overall dimensions and proportions taught by prior art and no further details will therefore be given thereabout. FIG. 2A illustrates a preferred structure and a preferred mode for forming an element. A main transparent sphere 110 of glassy or of resinous material of refractive index comprised between 1.45 and 1.65, preferably 1.50 to 1.60, is coated with a transparent resinous binder in an amount such as to form a layer in which, when the binder is still viscous, a suitable number of transparent resinous or glassy beads 122 are embedded to about half of their diameters. A transparent aggregate having a core sphere 110, a plurality of beads 122 and a layer 120 of the resinous binder connecting said beads to said sphere is thus provided, upon curing of such binder.

By providing a core sphere 110 and, beads 122 of glassy and/or of resinous transparent material and an intermediate binder layer 120, all of essentially equal refractive index, an essentially optically homogeneous body such as that diagrammatically indicated at 10 in FIG. 1 is thus provided.

When the core sphere and the beads are made of a transparent substance having a refractive index of 1.52 about, the binder layer 120 is preferably made by making use of acrylic or methacrylic and alpha-methyl-styrene copolymers. If core and bead components having a refractive index of 1.56 about are provided, the said intermediate layer 120 is preferably formed with a polycarbonate resin.

As shown in FIG. 2A, the said beads 122 are nearly half protruding from the intermediate binder layer 120 and therefore their outer surfaces are uncovered by such binder. Upon setting of the binder, said exposed surfaces are reflectorized by a suitable aluminum or silver coating 124, thus providing the inwardly reflective concave bowls 18. This coating can be applied by applying current art, such as a vacuum metallizing process.

Figure 2B:
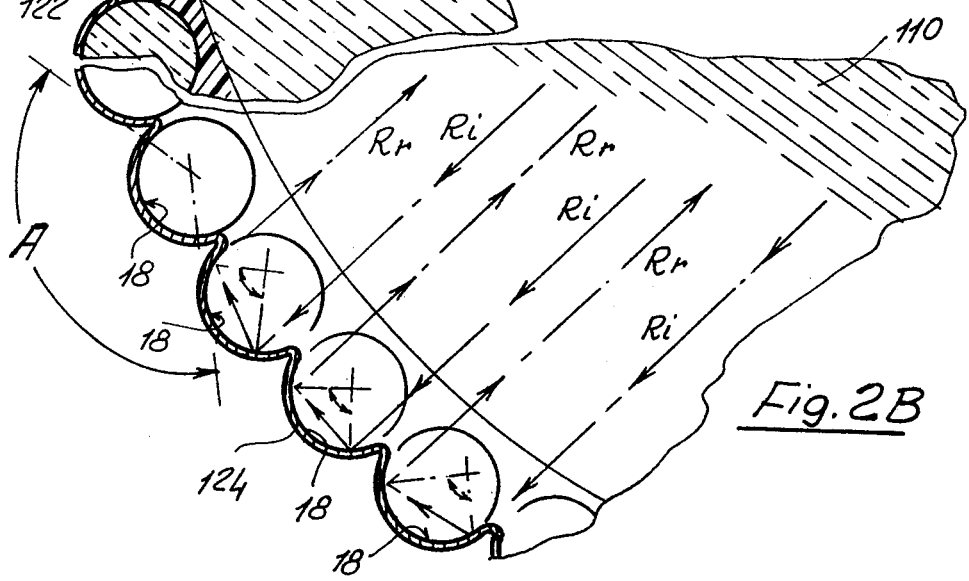

As shown in FIG. 2B, if an impinging ray such as indicated at R$i$ impinges on a location, in a concave reflective bowl 18, such that the same ray is reflected to impinge on another location, in the same bowl, spaced by 90° from the first location, the second reflection causes the ray to be reflected at R$r$ along a path parallel to that of its impingement thus providing the desired retro-reflection. The closer the angular amplitude A of said part-spherical bowls 18 is to 180°, the greater is the amount of light subjected to the desired retro-reflection. Therefore, the element is preferably with concave bowls 18 of amplitude A (the angle formed between two lines passing through two diametrally opposed points of the useful part-spherical portion of the bowl and intersecting at the center of such portion), well over 120°.

Retro-reflecting elements such as shown in FIG. 2A can be manufactured, by applying current art, by forming, locating and securing the transparent binder layer 120, the monolayer of closely spaced beads 122 and the inwardly reflective coating 124 all about the core sphere 110. The thus formed elements are partially embedded in the layer 12, also according to current art, when the composition of such layer is still viscous. The elements can also be preliminarily mixed and dispersed in such composition before forming the layer, by painting or otherwise applying it on a roadway pavement, or by extruding and/or calendering it into tape adapted to be applied and adhesively secured on said pavement.

At least a part of such elements will at least slightly protrude above the surface 16 of the applied and set layer 12. The coating 124, the beads 122 and the binder layer 120 are promply torn off by the traffic where above the surface 16, so that the exposed part-spherical surface at 14 is provided for light impingement. This provision can be anticipated by tearing off said components above the surface 14, such as by brushing, this procedure being especially adapted when road marking tape material is produced, so that such material will be fully servicable and visible at night when applied and secured on a roadway pavement.

The exposed surface 14 will progressively become wider upon wear by traffic as the layer 12 turn wears off. Similarly the elements, if any, which are completely embedded to a greater or lesser depth in the layer 12 (if of thickness sufficiently greater than the diameter of the elements) will progressively emerge at the surface 16 of the layer 12 and have their upper part-spherical surfaces 14 uncovered by traffic, concurrently with the wear of the layer.

The elements of the invention have been hereinbefore described as made use of for improving nighttime visibility of traffic regulating signs on a roadway pavement. It will however be evident to those skilled in the art that such elements can advantageously be made use of for other services. For example, elements as above described, encased or embedded for two-thirds to one-half of their diameters in a suitable support layer, and having their portions external to said layer uncoated by the components originally provided over the part-spherical surfaces 14 of their core spheres, can import sharp nighttime visibility to vertically arranged signs, such as "stop signs" for example, even when illuminated by light impinging from a direction forming very small angle with the generally planar surface of the sign.

I claim:

1. A substantially spherical reflecting element, comprising a transparent reflective body having a first portion bounded by a first surface section adapted to be impinged by rays from a source external to said body, a substantially part-spherical second portion, and a plurality of substantially part-spherical third portions projecting radially outwardly of said second portion and each bounded by a second surface section adapted to be impinged by rays from within said body; and a reflective material provided at least on some of said second surface sections, whereby a ray impinging said first surface section at an angle thereto is refracted into said body to pass therethrough in a first direction to one of said second surface sections to be reflected by said reflective material and to return through said body, in a second direction substantially opposite to said first direction, to said first surface section and ultimately towards said source, said body having substantially the same index of refraction throughout so that additional refractions and reflections within said body due to differential indices of refraction are substantially eliminated.

2. The element of claim 1, wherein said reflective second surface sections have angular amplitudes between 180° and 90°.

3. The element of claim 2, wherein said angular amplitudes are greater than 120°.

4. The element of claim 1, wherein said refractive index is between 1.45 and 1.65.

5. The element of claim 1, wherein said transparent body consists of a plurality of transparent components the relative refractive index of which is comprised between 0.8 and 1.2, said components being adjacent to each other for jointly forming an essentially optically homogeneous body through which light rays can pass without essential refractive deviations at the interfaces between said components.

6. The element of claim 5, comprising a transparent core sphere, a layer of a transparent binder coating said sphere except where said first portion is formed, a monolayer of transparent beads partially embedded into said binder, and said reflective material coating the not unembedded portions of said transparent beads.

7. The method for making an element as defined in claim 6, comprising the steps of providing a core sphere of a transparent substance, forming a layer of a resinous binder about said sphere, forming a monolayer of beads of a transparent substance about said binder layer, causing said beads to be embedded for about half of their diameters within said layer when said binder is viscous, causing said binder layer to set, forming an inwardly reflective coating on said beads where not embedded in said layer, and causing said binder layer and beads to be detached from a part-spherical portion of the surface of said core sphere, the said substances and resinous binder having a refractive index comprised between 1.45 and 1.65.

8. The element of claim 6, wherein said resinous binder is selected from the group consisting of acrylic or, methacrylic and alpha-methyl-styrene copolymers, and polycarbonate resins.

9. The element of claim 1, said first portion being of part-spherical configuration; and wherein said second surface sections are arranged closely adjacent one another.

10. The element of claim 1, said reflective material being provided on all of said second surface sections; and wherein said third portions are of a configuration such that the reflective surfaces formed by said reflective material, and which are arranged to deviate the rays refracted into said body, are at least almost entirely concave in relation to said body.

* * * * *